United States Patent [19]
Bottemiller

[11] 3,771,583
[45] Nov. 13, 1973

[54] FURNITURE CONSTRUCTION
[75] Inventor: Donald L. Bottemiller, Wadena, Minn.
[73] Assignee: Homecrest Company, Wadena, Minn.
[22] Filed: Sept. 20, 1971
[21] Appl. No.: 181,985

[52] U.S. Cl................ 160/327, 160/371, 160/383, 297/445
[51] Int. Cl........................ A47c 5/06, A47c 7/00
[58] Field of Search................... 160/383, 386, 388, 160/389, 327, DIG. 15; 297/445, 452, 441

[56] References Cited
UNITED STATES PATENTS

| | | | |
|---|---|---|---|
| 614,235 | 11/1898 | Palmer | 297/441 |
| 2,652,966 | 9/1953 | Griswold | 160/DIG. 15 |
| 3,021,176 | 2/1962 | Eads et al. | 297/452 |
| 2,878,861 | 3/1959 | Molla | 297/452 X |
| 3,084,979 | 4/1963 | Moore | 297/445 |

FOREIGN PATENTS OR APPLICATIONS

| | | | |
|---|---|---|---|
| 542,164 | 11/1955 | Belgium | 297/441 |
| 800,828 | 9/1958 | Great Britain | 160/383 |

Primary Examiner—Mervin Stein
Assistant Examiner—Philip C. Kannan
Attorney—Frederick E. Lange et al.

[57] ABSTRACT

A construction for securing plastic webbing members to a furniture frame in which a bar is rigidly secured parallel to and spaced from each of two opposed frame members, between which the webbing members are to extend, and in which each end of the webbing is passed over one of the frame members, then over the bar, and then back over the frame member over the initial end portion. The plastic webbing is of a type which when it is heating will stretch and upon cooling will return to its original length. The initial end portion of the webbing may be adhesively secured to the frame member and/or the overlying section of the webbing member to guard further against any possible slippage between the webbing and the frame.

2 Claims, 4 Drawing Figures

Patented Nov. 13, 1973

3,771,583

INVENTOR.
Donald L. Bottemiller
BY Frederick E. Lange
ATTORNEY

FURNITURE CONSTRUCTION

BACKGROUND OF THE INVENTION

To an increasing extent, many items of furniture, particularly chairs, have been formed by providing a frame element and then providing a supporting surface by extending sections of flexible webbing between opposed frame elements and securing them to such opposed frame elements. This type of construction results in a rather simple construction which provides a yieldable supporting surface which is attractive and may be readily cleaned. One problem, however, in connection with using such webbing is that of securing the webbing to the opposed frame members in a quick and inexpensive manner. Furthermore, it is obviously very desirable that the webbing not slip with respect to the frame since this will produce a permanent sag in the supporting surface. The use of rivets or similar fastening means is undesirable since the webbing material is often relatively soft and the rivet holes will gradually enlarge to the point where the rivet head may pass One the rivet hole. Various arrangements have been made for providing horizontally locking bars which are clamped into recesses in the frame member to lock the webbing material into position. One drawback to some of these arrangements is that the frame member must be specially formed to receive such bars, thus adding to the cost of the furniture construction.

SUMMARY OF THE INVENTION

The present invention is concerned with a simple construction for securing webbing members to spaced furniture frame members in which the use of auxiliary fastening members is dispensed with. Basically, the construction involves the provision of a cylindrical member secured to each of two opposed cylindrical frame members, the additional member being parallel to and held in a fixed spaced relationship with respect to the frame member. Each end portion of the webbing member is initially passed over the adjacent frame member, then over the spaced further member secured to the frame member and finally back over the frame member to the intermediate main portion of the webbing, the portion passing back over the frame member overlying the initial end portion so that when downward pressure is applied to the intermediate main portion, the overlying end portions of the webbing press the initial end portions into firmer engagement with the frame element. The additional member may be secured to the frame member by a plurality of cross rods rigidly secured to the frame member and the further cylindrical member. The spacing between these cross rods should preferably be related to the width of the webbing members and be spaced therebetween in such a manner that the cross rod is alays located where there would normally be space between adjacent webbing members. Each end of each webbing member preferably terminates beneath an overlying layer of the webbing member inwardly of the adjacent frame member so that this end is not visible from the upper side of the webbing member.

The webbing member should preferably be of a polyvinylchloride material of a type which has the property that when it is heated, it can be stretched but that when it is cooled, it returns to its original length. By heating such webbing members, it is possible to stretch them and dispose them properly with respect to the frame members and their adjacent parallel members and yet have the final webbing relatively firm with no slack in it when the material again recools.

While the construction described above holds the webbing firmly against slippage, it is possible where further assurance is desired against slipping to adhesively secure the webbing to the frame member and/or to the adjacent layer of webbing material.

Further objects and features of the present invention will be apparent from a consideration of the accompanying specification, claims and drawing.

DESCRIPTION OF THE PREFERRED EMBODIMENT

Figure 1:
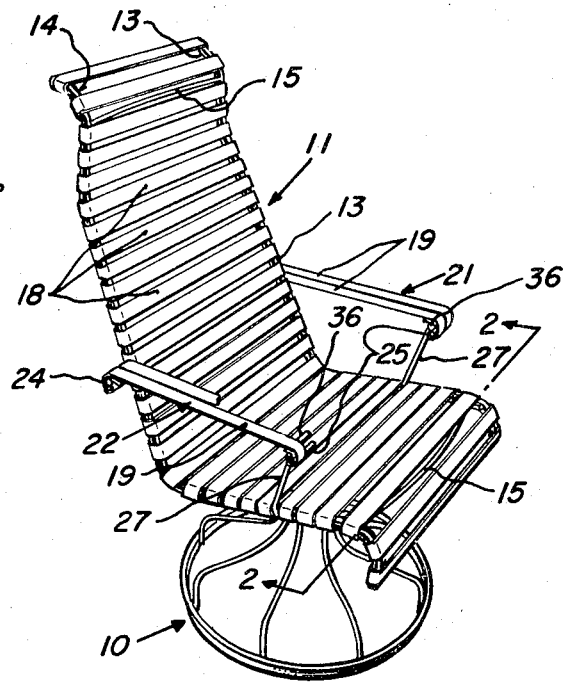
FIG. 1 is a perspective view of a chair employing my improved web construction in both the seat and back of the chair and in connection with the two arms thereof.
Figure 2:
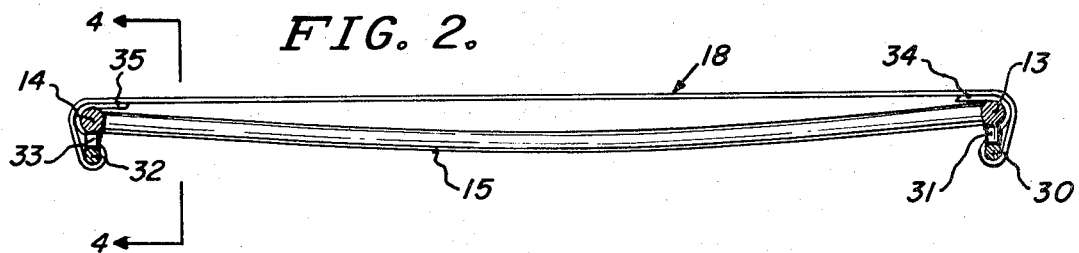
FIG. 2 is a sectional view taken along the line 2—2 of FIG. 1.

In FIG. 1, there is shown a chair using webbing for not only the seat and back but also the two side arms. The chair may be of any of various types using rods welded together to form a base portion 10 and a main chair portion 11. The main chair portion 11 may be secured in any suitable manner to the base portion 10. In one popular chair of this type, the main chair portion 11 is secured by means of a swivel and a pair of coil springs to the base 10 in order to provide a rocking chair which may be swiveled to any desired position. In the present instance, however, the base portion and the manner in which the main chair portion 11 is attached thereto are of no significance as far as the invention of the present application is concerned. Referring to FIGS. 1 and 2, the main chair portion 11 comprises two cylindrical longitudinal members 13 and 14, shown in the form of rods. These members 13 and 14 are suitably and similarly curved to define properly contoured seat and back portions. Members 13 and 14 are held spaced from each other by a plurality of cross rods 15, only a few of which appear in FIG. 1. These cross rods 15 are welded to the longitudinal rods 13 and 14 and are sufficiently numerous to provide a relatively rigid frame. The webbing, to be discussed later, is attached to this frame. The rods 15, as will be best observed in FIG. 2, are curved so as to be somewhat concave when facing the webbing. This is for the purpose of permitting the webbing to yield somewhat when the chair is occupied. At the same time, the rods 15 help to support the weight of the occupant and prevent the webbing from being unduly stretched. Extending between rods 13 and 14 are a plurality of flexible webbing members 18. These webbing members are formed of a flexible plastic material commonly referred to in the industry as polyvinylchloride furniture strapping. Similar webbing straps 19 are employed to provide the arm supporting surfaces of two chair arms 21 and 22. Typical webbing of this type is about 1 ⅜ inches wide and one-eighth inch thick. The arms similarly include spaced rods 24 and 25. The rods 24 are directly welded to the adjacent rods 13 and 14 and project outwardly therefrom a short distance. The rods 25 are secured to chair arm supporting rods 27 which are in turn secured at their lower ends to the main frame elements 13 and 14.

Referring specifically to FIG. 2, it will be noted that secured to the frame element or rod 13 is a rod 30. This rod is held in a parallel spaced relationship to frame element 13 by a plurality of rods 31 extending transverse to rods 13 and 30 and welded thereto. Similarly, secured to frame member 14 is a rod 32 which likewise is spaced from and extends parallel to frame member 14. Rod 32, which like rod 30, is cylindrical, is held spaced from the cylindrical frame member 14 by a plurality of transverse rods 33 welded to frame member 14 and rod 32.

Figure 4:
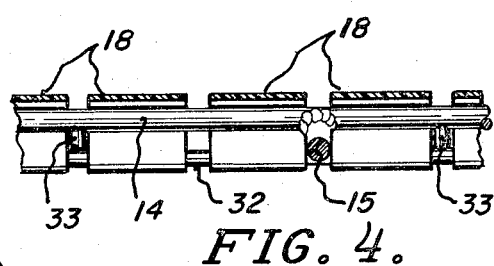
FIG. 4 is a fragmentary sectional view taken along the line 4—4 of FIG. 2.

As will be noted from FIG. 4, in connection with frame member 14, the transverse rods 33 are so spaced with respect to the width and normal spacing of the webbing straps 18 that the transverse rods 33 occur at points where the straps 18 would normally be spaced from each other. They thus do not interfere with the webbing straps 18 and serve to maintain the desired spacing between them. The same relationship is true of the transverse rods 31 associated with the frame member 13 and the rod 30.

As will be best noted from FIG. 2, starting with the right-hand extremity 34 of webbing strap 18, the strap is first passed over the cylindrical frame member 13. It is then wrapped to the left underneath the bar 30. From there, it passes along the outside of the chair over the inner right-hand end 34 so that it overlies this inner end. The strap is then brought over the frame member 14 and downwardly around the bar 32. The left-hand end 35 is then inserted between the frame member 14 and the portion of the strap 18 already overlying that frame member. It will readily be apparent that when the straps 18 are tightly secured in the manner just described, it will be almost impossible for the ends of the strap to be lossened. Any pressure exerted on the intermediate portion of strap 18 tends to clamp the inner end portions 34 and 35 more firmly against the frame members 13 and 14. Furthermore, because each end portion passes over a lower bar and then back over the frame member, practically no pulling force is ever exerted on either inner end of the strap. If one analyzes the forces exerted upon any given strap, the major force is exerted in a downward direction on the portion of the strap intermediate frame members 13 and 14. This results in a component of force longitudinally of the strap and in a direction tending to loosen the strap at both ends. This component, however, is much less than the main downward force. Furthermore, the portion of this component of force eventually applied to the inner end is negligible due to the friction between the strap and the rods 30 and 32. Furthermore, there is always a substantial component of force pressing downwardly and inwardly against the frame members 13 and 14 tending to hold the inner ends 34 and 35 of the strap 18 in firm contact with the frame members 13 and 14. Moreover, the material employed does not slide easily with respect to an underlying layer when the two are firmly held together. This is due to the fact that the material is somewhat yieldable and when two layers are pressed together, there is a tendency for the areas so compressed to be slightly thinner than the adjacent areas, thus minimizing the tendency of the two layers to be displaced with respect to each other.

In describing the manner in which webbing strap 18 was placed in position with respect to frame members 13 and 14 and rods 30 and 32, it was assumed that a certain amount of slack existed in the webbing member and that this slack was removed by pulling on one end of the strap 18. Actually, because of the manner in which the layers of strap 18 passing over frame members 13 and 14 overlie each other, it would be very difficult to remove all of the slack from strap 18 in this manner. The material of which strap 18 is made, however, tends to yield when heated and subjected to stress. At the same time, this material has a tendency to return to its original position upon cooling. In other words, the polyvinylchloride is of a type which has substantial "plastic memory". Thus, all that it is necessary to do is to heat the material of which the webbing straps are made prior to assembly to the frame members 13 and 14. The material is then applied as tightly as possible. There is still, however, some slack remaining in the intermediate portion of web members 18. As these cool, however, they tend to contract to their original length and in so doing, they assume the relatively taut position shown in FIG. 2.

The straps 19 of the chair arms are fastened in a very similar manner. As best shown in connection with the left-hand rod 25 in FIG. 1, there is secured to each of the rods 24 and 25 a second parallel rod 36. In each case, this second parallel rod is fixedly secured to the rod 24 or 25 by a cross rod which can be located between the two straps 19 of each arm. The straps can then be heated and secured at each end to the pair of spaced rods in a manner similar to thet just described in connection with straps 18. The straps 19 will thus be firmly held in position and will provide a yieldable arm construction which is very comfortable.

Figure 3:
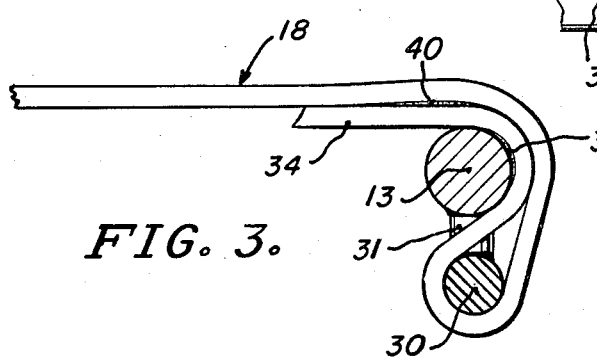
FIG. 3 is a view of a portion of the structure shown in FIG. 2 on a larger scale and showing the use of adhesive for further guarding against any possible slippage between the webbing and the frame.

While in their normal conditions the straps 18 and the straps 19 will be firmly held in position for the life of the straps by simply being looped ober the spaced rods at each end in the manner discussed, it is possible to employ some means for sealing the inner end of the webbing 18 either to the adjacent frame member or to the outer layer of the webbing or both if it is desired further to insure against any slippage of the webbing with respect to frame members 13 and 14. In FIG. 3, I have illustrated the inner end 34 of the strap 18 as being adhesively secured at 39 to the frame member 13. Similarly, the outer and inner portions of strap 18 are shown as being adhesively secured together at area 40. The adhesive areas 39 and 40 may be in the form of some adhesive which is fluid only when hot or some form of transfer tape. By providing one or more of the adhesive areas 39 and 40, any tendency of the strap 18 to loosen up at the end is further minimized.

It will be seen that I have provided an extremely simple and inexpensive method of securing webbing to a furniture frame. The elements that are used are all of standard material and require no special molding or machining. The webbing, when secured in this manner, will be firmly held for the life of the webbing.

As noted above, I preferably employ a polyvinylchloride furniture webbing of a type having a substantial plastic memory. The webbing I employ has a tensile strength of from 1,400 to 2,800 lbs. per square inch. It will, of course, be understood that other plastic materials having the desired properties can be employed.

While I have shown the novel means for attaching the webbing in connection with a chair construction, it is to be understood that the same means can be employed with other furniture such as tables, etc. In general, while I have shown certain specific embodiments of my invention, it is to be understood that the scope of the invention is to be limited soley by the appended claims.

I claim as my invention:

1. A furniture construction comprising two spaced cylindrical frame members, means holding said frame members in a relatively fixed spaced relationship, flexible webbing members extending between said frame members and secured thereto, said webbing members being of a plastic material which will readily stretch when heated but which has a substantial "plastic memory" so that it will return to its original length at room temperature, each of said frame members having a further cylindrical member of smaller cross-sectional area than said frame member, said further member being secured to said frame member in spaced, parallel relationship therewith by a plurality of cross members extending between and rigidly secured to the frame member and the further cylindrical member at various points between adjacent spaced webbing members intermediate the ends of said frame member and further member, each of said webbing members having an intermediate main portion and end portions continuous therewith, each end portion initially passing over one of said frame members, then over the spaced further cylindrical member secured to said frame member, and finally to said intermediate main portion back over said frame member and overlying said intermediate main portion back over said frame member and overlying said initial end portion, said webbing members being under sufficient tension at room temperature that the overlying end portion of the webbing presses the initial end portion into firm engagement with said frame member, and the initial end portion of each webbing member being adhesively secured to the overlying portion of said webbing member adjacent to the area where both portions extend over the frame.

2. The furniture construction of claim 1 in which the initial end portion of each webbing member is also adhesively secured to the frame member over which it passes.

* * * * *